May 2, 1967  G. N. KNOWLTON  3,316,565
CARRIER FOR LIVING BEINGS
Filed April 9, 1965
2 Sheets-Sheet 1
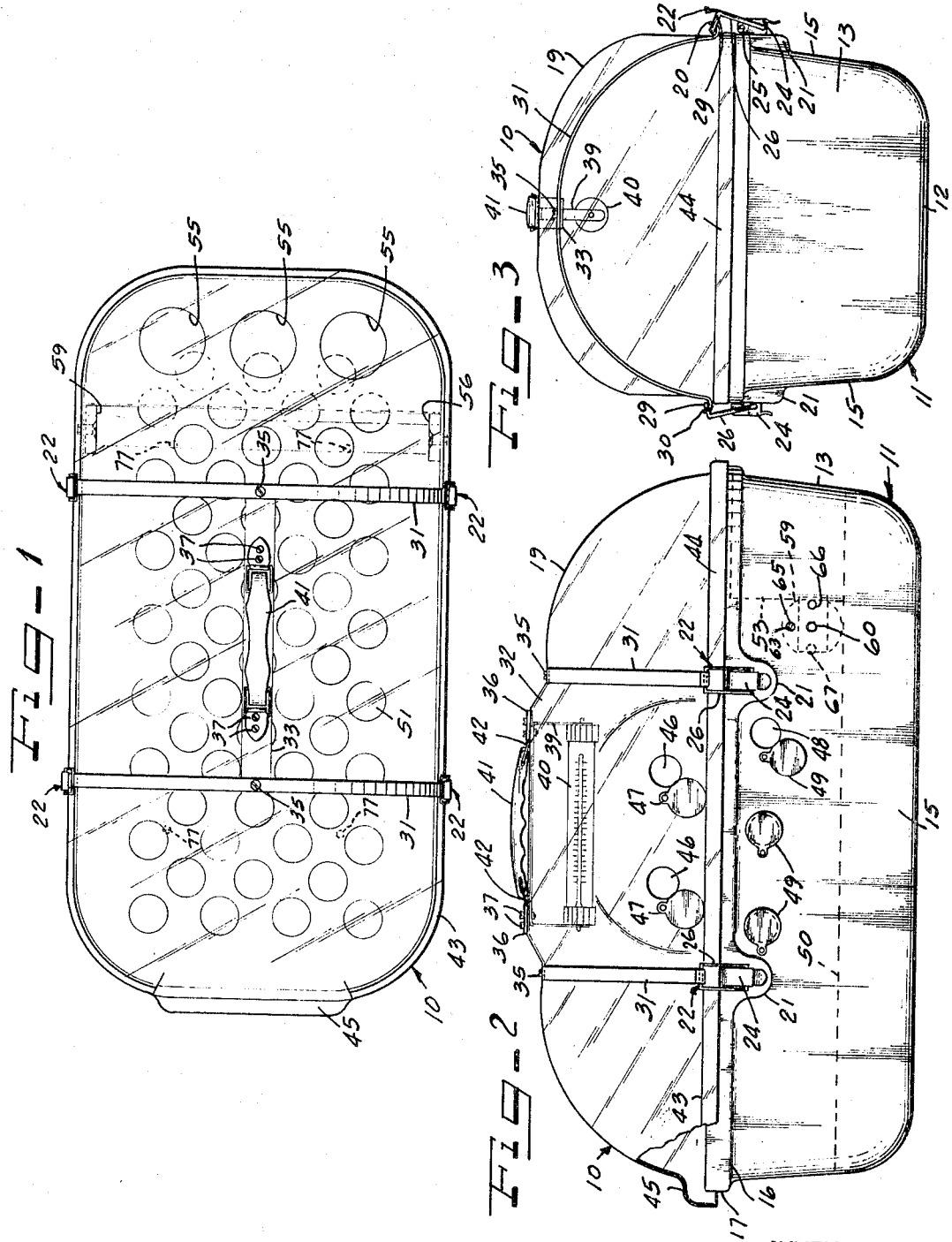
INVENTOR.
GERALD N. KNOWLTON
BY *Hill, Sherman, Meroni, Gross & Simpson* ATTORNEYS

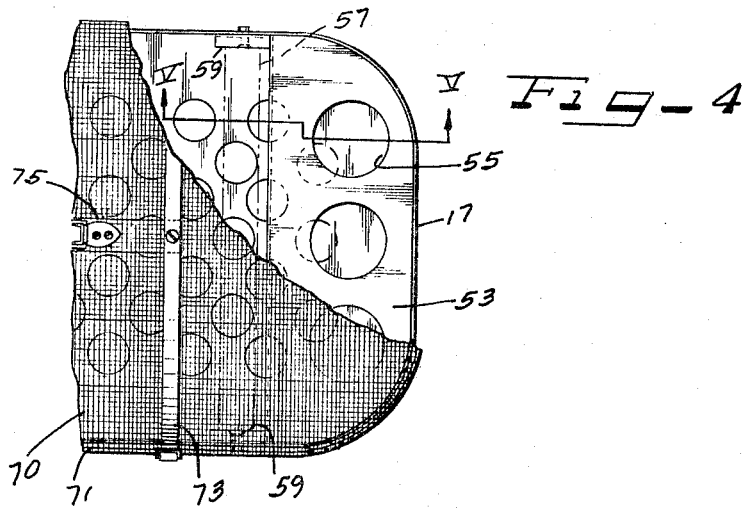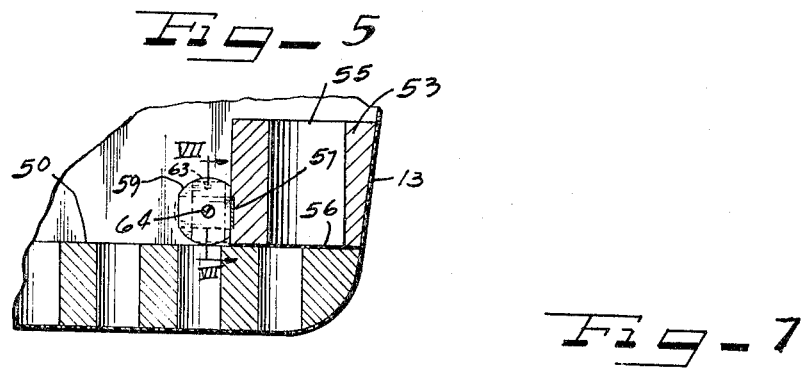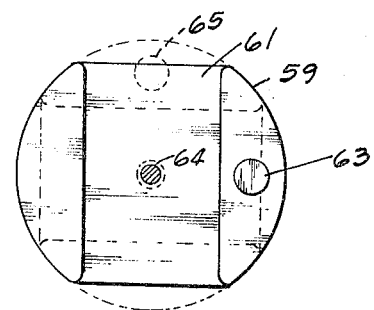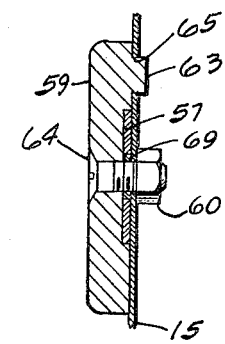

United States Patent Office 3,316,565
Patented May 2, 1967

3,316,565
CARRIER FOR LIVING BEINGS
Gerald N. Knowlton, Chicago, Ill., assignor, by direct and mesne assignments, of two-thirds to Samuel O. Broyde
Filed Apr. 9, 1965, Ser. No. 446,854
12 Claims. (Cl. 5—97)

This invention relates to portable carriers and more particularly relates to a carrier for living beings such as infants, pets and the like.

A principal object of the present invention is to provide a portable carrier for transporting and protecting small living beings such as infants, arranged with a view toward lightness in weight and ease in viewing the interior of the carrier.

Another object of the invention is to provide a ventilated carrier having a transparent removable cover providing opportunities for frequent and undisturbed dormancy to a small living being in the carrier with maximum visibility of the inside of the carrier.

A further object of the invention is to provide a carrier for infants and the like, which may readily be carried by the hand and affords a maximum degree of protection against sudden and extreme variations in temperature, and against wind, precipitation, smoke, dust, animals, birds, insects and flying debris and other hazards.

A still further object of the invention is to provide an improved form of carrier for infants, forming a protective bed for the infant and providing for the optional storage of food, drink or other articles.

A still further object of the invention is to provide a portable protected carrier for infants and the like having a transparent removable cover in which a handle connected to the cover affords a means for carrying the carrier with no more effort than the carrying of the usual hand luggage.

A still further object of the invention is to provide a portable carrier for infants and the like having an opaque upwardly opening container forming a receptacle for a mattress, and a plastic cover for the receptacle, with ventilating means in the side walls of the receptacle having valve means associated therewith, for regulating the flow of air into the receptacle, and wherein the cover so cooperates with one end of the container to afffford a passageway thereinto, cooperating with the ventilating means in the side walls of the container to enable the flow of ventilating air into the container to be controlled to avoid subjecting the infant therein to drafts.

Still another object of the invention is to provide a portable container for infants and the like, in which a mattress extends along the bottom of the container and is held in place by a bottle container at one end thereof, and the means for holding the bottle container in place is positionable upon removal of the bottle container to hold the mattress in place.

A still further object of the invention is to provide a portable plastic carrier for infants and the like having an opaque upwardly opening container and a transparent cover therefor arranged to be selectively mounted on a wheeled undercarriage where desired.

A still further object of the invention is to provide an improved form of portable carrier for infants and the like having an opaque plastic container with a transparent dome-like cover therefor in which the cover may readily be interchanged for a screened cover for hot weather use.

These and other objects of the invention will appear from time to time as the following specification proceeds and with reference to the accompanying drawings wherein:

FIGURE 1 is a top plan view of a portable carrier constructed in accordance with the principles of the present invention;

FIGURE 2 is a view in side elevation of the carrier shown in FIGURE 1, with part of the cover broken away and shown in section, in order to show the air ventilating opening in the end of the carrier;

FIGURE 3 is an end view of the carrier shown in FIGURES 1 and 2;

FIGURE 4 is a fragmentary end view of the carrier shown in FIGURE 1, showing a screened cover substituted for the transparent cover of FIGURE 1;

FIGURE 5 is a fragmentary vertical sectional view taken substantially along line V—V of FIGURE 4;

FIGURE 6 is an end view of the anchor for the strap, holding the mattress and bottle container in position, looking at the anchor from the inner side thereof; and FIGURE 7 is a partial fragmentary vertical sectional view taken substantially along line VII—VII of FIGURE 5.

In the embodiment of the invention illustrated in the drawings, reference numeral 10 generally designates a portable enclosed carrier intended for small living beings, such as infants, but which may also be used for pets, laboratory animals or even various articles, where it is required that the contents may be readily viewed.

The carrier includes generally an elongated open topped receptacle 11 having a bottom 12, opposite end walls 13, 13 extending upwardly of said bottom and side walls 15, 15 connecting said bottom and end walls together. The receptacle may be molded from a light weight plastic material, which is light in weight and may preferably be an opaque plastic, and is so formed that the bottom, side and end walls will be connected at their edges along uniform curves to free the receptacle from sharp corners and to provide a clear, readily cleanable interior.

The end and side walls 13, 13 and 15, 15, respectively, extend outwardly at their upper end portions to form a ledge 16 extending outwardly therefrom throughout the periphery thereof. A flange 17 defines the outer margin of the ledge 16 and extends upwardly therefrom to be engaged by the inside of a corresponding flange 44 extending about and downwardly of a cover 19 for the receptacle.

The flange 17 has spaced embossments 21, 21 extending downwardly therefrom along the side walls 15, 15, intermediate the ends thereof, affording a means for securing latches 22, 22 to opposite side walls of the receptacle. The latches 22, 22 may be well known forms of toggle types of suitcase latches, including locking members 24, 24 extending downwardly along the embossments 21, 21 and pivoted thereto adjacent the upper ends thereof on pivot pins 25. The locking members 24, 24 have toggle links 26, 26 pivoted thereto beneath the pivot pins 25 and have inwardly extending right angled loop portions 29, adapted to hook onto the upwardly extending hooked end portions 30 of straps 31, extending over the cover, and suitably secured thereto. When the latch members 24 are in their upwardly pivoted positions the right angled ends of the toggle links 27 may be engaged with the end portions 30 thereof. The latch members 24 may then be pivoted downwardly into an overcenter position with respect to the pivotal axes 25 and hooked ends 30 of the straps 31, to positively latch the cover 19 to the receptacle 11.

The cover 19 is shown in the drawings as being of a generally dome-like form although it may be of any suitable form, as long as it affords room for the infant within the carrier, and ample ventilating space above the head of the infant.

The cover 19 may be made from a suitable transparent plastic and has a raised central portion 32, disposed inwardly of the straps 31, along which extends a handle strap 33, extending along the inside of said cover from one strap 31 to the other and suitably secured thereto, as by screws 35 or any other suitable securing means. The handle strap 33 on the inside of the raised top portion 32 of the cover 19 has spaced handle brackets 36, 36 attached thereto as by nuts and bolts 37, 37. The bolts 37 also form a means for mounting a bracket 39 for a thermometer 40 on the inside of the cover 19. The thermometer 40 may thus indicate the temperature on the inside of the carrier.

The handle brackets 36, 36 have a conventional handle 41 connected thereto, as by pivoted links 42, 42, to accommodate the entire carrier to be lifted by the hand.

The cover 19 has a shoulder 43 extending outwardly of its lower end portion and entirely around the lower end portion of the cover. The shoulder in turn terminates into a downwardly turned boundary flange 44, extending about the cover and along the outside of the flange 17 of the receptacle, when the cover is in position on the receptacle.

The shoulder 43 at one end of the cover is spaced upwardly of the top of the flange 17 and extends outwardly of said flange, to form an elongated end portion 45 at one end of the cover, spaced outwardly of the flange 17 to form a ventilating passageway at one end of the container.

Thus, where the carrier is carrying an infant, the head of the infant may be placed at the opposite end of the receptacle from the air passageway, and where the carrier may be in the open, the closed end of the receptacle may be placed to face the wind, so wind blowing thereon will not blow against the head of the infant.

As shown in FIGURE 2 spaced air openings 46, 46 are formed in each side wall of the cover between the straps 31, 31. These air openings may be closed by pivoted flap valves 47, 47, which may be used to govern the amount of air flowing through said air openings. The side walls 15, 15 of the receptacle also have a plurality of air openings 48 leading therethrough, the areas of which openings may be adjusted by pivoted flap valves 49. With the valves 47, 47 and 49, 49 adjusting the areas of the ventilating openings 46 and 48, the amount of air entering the carrier may be governed, and the openings 46, 46 and 48, 48 may cooperate with the ventilating passageway at the foot end of the carrier, to accommodate air to enter the carrier through the side openings and to be withdrawn through the end opening and vice versa, depending upon the position of the carrier with respect to the wind.

The cover 19 may be pliable so that when the loaded carrier is lifted and carried by hand, the lifting and walking motion will cause the cover to flex and draw air into and force air out of the receptacle with a pumping action.

The receptacle 11 has a mattress 50 extending along its bottom and formed to conform to the bottom, side and end walls thereof. The mattress 50 may be made from a foam material, such as a foam polyethylene material or a foam rubber having a plurality of uniformly spaced holes 51 leading therethrough. A polyethylene or vinyl foam material is preferred over foam rubber due to the lightness in weight of the polyethylene or vinyl material, in contrast to foam rubber. The thickness of the mattress may be sufficient to provide a firm but relatively resilient support for the infant.

A storage compartment housing 53 for bottles and the like is shown as being at the opposite end of the receptacle from the air opening, and may be made from a vinyl or foam polyethylene material, to generally conform to the side and end walls of the receptacle, and is shown as having a plurality of openings or holes 55, 55 leading therethrough of a size to receive bottles, food containers or any other articles it may be desired to carry. The compartment housing 53 rests on a plate or sheet 56 to prevent small articles or liquid from falling through the holes in the mattress, and is retained in position by a strap 57 extending along and recessed in the inner wall of the storage compartment housing. The strap 57 may be made of any suitable material, such as a fabric or elastic, capable of being stitched and may extend across the receptacle 11 in a vertical position to retain the compartment housing 53 in position and may be positioned to extend across the receptacle in a horizontal position over the top of the mattress 50 to retain the mattress 50 in position.

As shown in FIGURES 4, 5, 6 and 7, the strap 57 is anchored to the insides of the side walls 15, 15 of the receptacle by anchor blocks 59, adjustably mounted on each wall of the receptacle on bolts 64. The bolts may be countersunk head types of bolts to provide uninterrupted surfaces along the inner faces of the anchor blocks.

Each anchor block 59 has a central groove 61 extending therealong to receive the strap 57. The groove 61 is rounded at its opposite ends to enable the same anchor block to be used on each side wall of the receptacle. A locating pin or lug 63 extends from the anchor block 59 and is registrable with an aperture 65 in a side wall 15, retaining the anchor block 59 in position to hold the strap 57 into engagement with the inner end wall of the storage compartment housing 53. The anchor block 59 may be pivoted about the axis of the bolt 64 upon loosening of the nut 60 to position the locating pin or lug 63 to register with an aperture 66 in the wall 15, spaced 90° from the aperture 65, to locate the groove 61 to extend vertically along the side wall and retain the strap 57 in engagement with the top of the mattress 50, as shown by dot dash lines in FIGURE 4.

It should here be noted that an aperture 66 is provided on one side wall 15, while a similar aperture 67 is provided in the opposite side wall 15, spaced 180° from the aperture 66, to be engaged by a locating pin 63 of the opposite anchor block 59 and thereby accommodate the same anchor block to be used on each side of the receptacle.

The strap 57 may have a grommet 69 therein, through which the screw or bolt 64 extends, to retain the strap in position. While the strap 57 is herein shown as being of a single ply at its ends, it may be folded over and stitched where greater strength is required.

In FIGURE 4 of the drawings I have shown the cover 19 replaced by a screen cover 70. The cover 70 may be formed from a small mesh screen formed to conform to the flange 17 and may be bounded at its lower end portion by a strap 71 extending thereabout and extending along the inside of the flange 17.

The screen cover 70 has parallel spaced straps 73 extending thereover connected together by a handle strap 75 on which a handle may be mounted, as is the form of the invention shown in FIGURE 1.

The cover 70 is therefore an alternate cover interchangeable with the cover 19 for warm weather use.

In FIGURE 1 of the drawings I have also shown a plurality of holes 77 leading through the base 12 of the receptacle 13. The holes 77 afford a means for attaching the receptacle to a wheeled carriage or to collapsible legs, where desired.

A sun shade (not shown) may be placed over the cover 19, either over part of the cover or the entire cover depending upon the time of day. This sun shade may be made from a thin flexible sheeting which may be hooked to the flange 18 and stretched or partially stretched over the cover where necessary.

It should here be understood that while I have particularly directed the description of the carrier to a carrier for infants, that it may be used to carry pets, laboratory animals or other articles as well, and that where used as a carrier for pets, the mattress 50 and storage compartment 53 may be removed. A protective sanitary pad may be placed on the mattress to enable the container to be more readily cleaned, where required, by replacing the pad with another pad.

It may be seen from the foregoing that I have provided a lightweight portable carrier for living beings, and particularly infants and that the carrier is so constructed as to afford maximum protection for the infant while being carried along the street or in automotive vehicles.

It may further be seen that the ventilation of the carrier may readily be regulated, that the temperature and conditions within the carrier may be determined at a glance and that flexing of the carrier cover and receptacle, when carrying the carrier by hand, aids in the ventilation of the carrier.

While I have herein shown and described one form in which the invention may be embodied, it may readily be understood that various variations and modifications in the invention may be attained without departing from the spirit and scope of the novel concepts thereof.

I claim as my invention:

1. A portable carrier particularly adapted for carrying living beings comprising,
   an elongated open top receptacle made from an opaque plastic material and having connected side and end walls and a vertically extending flange extending about and upwardly of said walls,
   a transparent cover for said receptacle generally conforming to the open end thereof, and having a shoulder extending thereabout engageable with said flange on said receptacle and having a retaining flange depending from said shoulder and extending along the outside of said flange on said receptacle,
   a handle at the top of said cover enabling said cover to be carried by the hand,
   and means forming a support for said handle on said cover and detachably connecting said cover to said receptacle comprising,
      a pair of parallel straps extending over the top of said cover along the outside thereof and downwardly along the side walls thereof and having hooked lower end portions,
      a handle strap extending along the inside of said cover and connecting said straps together and forming a means for the attachment of said handle to said cover and straps,
      and toggle latches engageable with said hooked ends of said straps and mounted on opposite sides of said receptacle for retaining said cover to said receptacle.

2. A portable carrier in accordance with claim 1, wherein the cover is made from a transparent plastic material.

3. A portable carrier in accordance with claim 1, wherein the cover is made from fine mesh screen.

4. A portable carrier particularly adapted for carrying living beings comprising,
   an elongated open top receptacle formed from an opaque plastic material and having a bottom and connected side and end walls extending upwardly therefrom,
   a flange extending about said side and end walls and upwardly therefrom and defining the upper margin of the open top of said receptacle,
   a transparent cover for said receptacle, of a generally dome-like form having a shoulder extending laterally of the lower end portion thereof, adapted to rest on said flange on said receptacle, and having a flange extending downwardly along the outer margin of said flange on said receptacle,
   spaced straps extending upwardly along the sides of said cover and over the top thereof and secured thereto,
   a handle strap extending along the top of said receptacle and secured to said spaced straps,
   a handle mounted on said handle strap,
   toggle locks mounted on said side walls of said receptacle and engageable with said spaced straps for locking said cover to said receptacle,
   and air ventilating openings in said cover and receptacle accommodating the entrance of air into said carrier and the expulsion of air therefrom.

5. A carrier in accordance with claim 3,
   wherein the cover is made from a transparent plastic material sufficiently pliable to flex when lifting and walking and carrying the carrier by said handle, to thereby give a pump-like effect to the inside of said carrier when loaded and assist in drawing air into and expelling air from said air ventilating openings.

6. In a portable carrier particularly adapted for carrying infants,
   an elongated open top receptacle having a bottom and connected side and end walls extending vertically therefrom, and a vertically extending flange extending about said walls,
   a transparent plastic cover for said receptacle generally conforming to the open end thereof and having a shoulder extending thereabout and a flange extending about said shoulder and adapted to extend along the outside of the flange on said receptacle,
   means detachably securing said cover to said receptacle,
   a handle connected with said means for lifting said cover and said receptacle,
   a mattress extending along the bottom of said receptacle,
   a storage compartment housing extending across one end of said receptacle and supported on said mattress,
   and means engageable with said storage compartment housing for retaining said mattress and compartment housing in place in said receptacle.

7. A portable carrier in accordance with claim 6,
   wherein the means for retaining the storage compartment housing in place on said receptacle includes,
      a strap extending across said receptacle, and recessed in a front wall of said storage compartment housing,
      and anchoring plates anchoring said strap to said receptacle.

8. A portable carrier in accordance with claim 7,
   wherein the anchoring plates are mounted in the side walls of the receptacle for rotatable movement with respect thereto about axes extending transversely of the receptacle, to position the strap to engage the storage compartment housing and to change the position of the strap, to accommodate removal of the storage compartment housing and to engage the top surface of the mattress, to retain the mattress in place in the receptacle, and
   wherein pin and aperture registering connections are provided between the anchor plates and the side walls of the receptacle, to register the anchoring plates in their two operative positions.

9. In a portable carrier,
   an elongated open top receptacle having a bottom and connected side and end walls extending upwardly therefrom, and a vertically extending flange extending about said side and end walls,
   a transparent plastic cover for said receptacle generally conforming to the open end of said receptacle and being dome-like in shape and having a shoulder extending thereabout and engageable with the top of said flange extending upwardly of said receptacle, and a flange depending from said shoulder and adapted to extend along the outside of said flange extending upwardly of said receptacle,
   straps extending along the sides and over the top of said cover on opposite sides of the transverse center thereof and having hooked lower end portions,
   a handle strap extending longitudinally of said cover between said straps along the top thereof and on the inside thereof and secured to said straps and to the top of said cover,
   a handle secured to said handle strap, toggle locking means pivotally connected to opposite side walls of said receptacle for engagement with the hooked ends of said straps for locking said cover to said receptacle, a plurality of air ventilating openings in the side walls of said receptacle, and the flange of said cover extending beyond the flange of the end wall of said receptacle at one end of said cover, to afford a means for the access of air into said container from an end thereof.

10. In a portable carrier, an elongated open top receptacle having a bottom and connected side and end walls extending upwardly therefrom, and a vertically extending flange extending about said side and end walls, a transparent plastic cover for said receptacle generally conforming to the open end of said receptacle and being dome-like in shape and having a shoulder extending thereabout and engageable with the top of said flange extending upwardly of said receptacle, and a flange depending from said shoulder and adapted to extend along the outside of said flange extending upwardly of said receptacle, straps extending along the sides and over the top of said cover on opposite sides of the transverse center thereof and having hooked lower end portions, a handle strap extending longitudinally of said cover between said straps along the top thereof and on the inside thereof and secured to said straps and the top of said cover, a handle secured to said handle strap, toggle locking means pivotally connected to opposite side walls of said receptacle for engagement with the hooked ends of said straps for locking said cover to said receptacle, a plurality of air ventilating openings in the side walls of said receptacle, and the flange of said cover extending beyond the flange of the end wall of said receptacle at one end of said cover, to afford a means for the access of air into said container from an end thereof, a mattress extending along the bottom of said receptacle and made from a perforated foam material, a storage compartment housing supported on said mattress at one end of said receptacle and extending upwardly therefrom, a strap recessed in the inner wall of said storage compartment and anchored to the side walls of said receptacle at its ends, to retain said storage compartment housing and mattress in place within said receptacle.

11. A portable carrier in accordance with claim 10, wherein anchoring plates are adjustably secured to the insides of the side walls of said receptacle and form anchoring means for said strap to retain said strap in engagement with the front wall of said storage compartment housing and to accommodate removal of said storage compartment housing from said receptacle, and to retain the mattress in place in said receptacle by engaging said strap with the top of said mattress.

12. A portable carrier in accordance with claim 11, wherein the anchoring plates are rotatably mounted in the walls of the receptacle, and wherein pin and aperture registering connections are provided between said anchoring plates and the walls of said receptacle, to locate said anchoring plates to position said strap into engagement with an end wall of said storage compartment housing and to accommodate the position of said strap to be changed, to locate said strap in position to engage the top of said mattress.

References Cited by the Examiner

UNITED STATES PATENTS

| | | | |
|---|---|---|---|
| 2,288,538 | 6/1942 | Morrison | 2—284 |
| 2,470,721 | 5/1949 | Pragel | 128—1.02 |
| 2,586,247 | 2/1952 | Mover | 5—98.21 |
| 2,659,905 | 11/1953 | Rochford | 5—362 |
| 3,070,086 | 12/1962 | Smith et al. | 128—1.02 |
| 3,121,881 | 2/1964 | Schnell | 5—82 |
| 3,165,760 | 1/1965 | Abajian | 5—97 |

FRANK B. SHERRY, *Primary Examiner.*

FRANCIS K. ZUGEL, R. D. KRAUS,
*Assistant Examiners.*